United States Patent

Peiffer et al.

[11] Patent Number: 5,914,079
[45] Date of Patent: Jun. 22, 1999

[54] PROCESS FOR THE TREATMENT OF A SEALABLE FILM SURFACE

[75] Inventors: Herbert Peiffer, Mainz; Robert Schmidt, Bad Homburg; Detlef Busch, Saarlouis; Frank Ernst, Eppstein, all of Germany

[73] Assignee: Hoechst Aktiengesellschaft, Germany

[21] Appl. No.: 08/615,357

[22] Filed: Mar. 14, 1996

[30] Foreign Application Priority Data

Mar. 14, 1995 [DE] Germany .......................... 195 08 668

[51] Int. Cl.⁶ ............................................. B29C 59/08
[52] U.S. Cl. ......................... 264/80; 264/211.2; 264/345
[58] Field of Search ............................ 264/80, 211.12, 264/211.2, 345, 346

[56] References Cited

U.S. PATENT DOCUMENTS

| | | |
|---|---|---|
| 2,632,921 | 3/1953 | Kreidl . |
| 2,746,084 | 5/1956 | Kreidl ........................................ 264/80 |
| 2,795,820 | 6/1957 | Grow et al. ................................. 264/80 |
| 3,145,242 | 8/1964 | Bryan ......................................... 264/80 |
| 3,153,683 | 10/1964 | Bryan et al. ................................ 264/80 |
| 3,153,684 | 10/1964 | Bryan et al. ................................ 264/80 |
| 3,361,607 | 1/1968 | Bruno ......................................... 264/80 |
| 3,900,538 | 8/1975 | Kawakami et al. ......................... 264/80 |
| 4,255,123 | 3/1981 | Bishilany, III et al. . |
| 4,634,373 | 1/1987 | Rattner . |
| 5,560,885 | 10/1996 | Murschall et al. ......................... 264/80 |
| 5,573,723 | 11/1996 | Peiffer et al. .............................. 264/80 |

FOREIGN PATENT DOCUMENTS

| | | |
|---|---|---|
| 1 007 051 | 7/1952 | Germany . |
| 1 569 313 | 7/1970 | Germany . |
| 2203510 | 8/1973 | Germany . |
| 9001676 | 4/1990 | Germany . |
| 41 06 358 A1 | 9/1992 | Germany . |
| 1005454 | 9/1965 | United Kingdom . |
| 1117354 | 6/1968 | United Kingdom . |

OTHER PUBLICATIONS

Patent Abstracts of Japan, vol. 011, No. 098 (M–575), Mar. 27, 1987 & JP 61 246512 A (Matsushita Electric Ind Co Ltd), Nov. 1986.

Primary Examiner—Jan H. Silbaugh
Assistant Examiner—Mark Eashoo
Attorney, Agent, or Firm—Connolly & Hutz

[57] ABSTRACT

In the treatment of a sealable film surface by means of a flame, a film is passed over a cooling roll (4). A burner (1) is mounted above this cooling roll (4). An unpolarized flame is produced by means of this burner (1). The film is cooled by means of the cooling roll (4) and, if required, by means of additional cooling apparatuses so that the temperature of the flame-treated film surface on leaving the cooling roll (4) is not more than 25° C.

15 Claims, 3 Drawing Sheets

PROCESS FOR THE TREATMENT OF A SEALABLE FILM SURFACE

BACKGROUND OF INVENTION

The present invention relates to a process for the treatment of a sealable film surface by means of a flame. The films are distinguished by good sealability, good printability and good antistatic behavior.

The flame treatment and the corona treatment are used for increasing the surface tension of polypropylene films. This makes the films printable, and wettable with water-based coating systems. While the corona treatment is used in the case of sealable and nonsealable films, the flame treatment is used mainly in the case of nonsealable films.

In the flame treatment of nonsealable films, the film is passed over a cooling roll below which a gas burner is arranged. The distance between burner and film surface/cooling roll is from 3 to 10 mm and is chosen so that the oxidation reactions on the polymer surface are maximum. The oxidation of the polymer surface results in the formation of oxidized polar groups, with the result that the surface tension of the film is increased in the desired manner. Preconditions for satisfactory treatment of the film are exact feeding of the film web on the cooling roll and a constant cooling roll temperature. The feeding of the film on the cooling roll is effected as a rule by means of a gummed nip roll.

It is taught that the treatment of nonsealable films should be carried out at a cooling roll temperature greater than 36° C. (cf. "The base flame treatment process", H. Angeli/Fa. Esse Ci, 3rd International Meeting on the Plastic Surface Treatment, 1989, Narni, Italy). Below this temperature, the film surface exhibits water vapor condensation, which makes the film useless. A typical cooling roll temperature in the case of non-sealable film is 40° C.

The flame treatment of nonsealable films has advantages over the corona treatment. These are a high surface tension which is constant as a function of time, little odor of the film and no effect on the back. A disadvantage is the very high thermal load of the film surface.

Sealable polypropylene films, which are sensitive to thermal load, are damaged in the flame treatment in such a way that they lose their sealability. The application of the process described above to sealable films is therefore not feasible. The thermal load of the sealable surface is too high, and the water vapor condensation described occurs when the cooling roll temperature is reduced.

In the case of sealable films, the use of the flame treatment with polarization is therefore taught (cf. "The polarized flame process", H. Lori/Fa. Esse Ci, 3rd International Meeting on the Plastic Surface Treatment, 1989, Narni, Italy). In this method, the burner is arranged above the cooling roll. A dc voltage is applied between the burner and the cooling roll, with the result that the ionized atoms in the flame are more highly accelerated and strike the polymer surface with higher kinetic energy. The chemical bonds within the polymer molecules are more readily broken, and the formation of free radicals takes place more rapidly. The thermal load of the polymer surface is lower than in the flame treatment without polarization. At the same flame temperature, a higher surface tension is achieved in the process with polarization than in the process without polarization. In other words, in order to achieve the same surface tension, a lower flame temperature is required in the process with polarization than in the process without polarization, with the result that the seal layer is protected. Owing to the changed thermal conditions, the cooling roll temperature can therefore be reduced to a temperature of 20° C. in the flame treatment with polarization, without condensation occurring on the film surface.

The disadvantage of the flame treatment with polarization is the high static charge build-up on the film. The following adverse aspects are associated with this:

1. The film is more difficult to handle. The wound film is charged to such an extent that it can no longer be handled by the machine operator. There is a high risk of accidents, which cannot be eliminated by technical measures such as active or passive discharge of the film.
2. The quality of the film is reduced. The high static charge build-up on the film results in optical defects, such as flash figures, shrink marks and indentations during its production.
3. The processibility of the film is poorer. The high static charge build-up on the film leads to problems with unwinding and to material back-up during processing of said film on packaging machines.

It was therefore the object of the present invention to provide a process for the surface treatment of a film, in which a polypropylene film having good sealing properties and good antistatic behavior can be produced.

DETAILED DESCRIPTION

This object is achieved by a process of the generic type stated at the outset, whose characteristic features are that a) a film is passed over a cooling roll (4) and b) a burner (1) is mounted above this cooling roll (4) and c) an unpolarized flame is produced by means of this burner (1) and d) the film is cooled by means of the cooling roll (4) and, if required, by means of additional cooling apparatuses, so that the temperature of the flame-treated film surface on leaving the cooling roll (4) is not more than 25° C.

Surprisingly, sealing properties of the pretreated surface which are virtually as good as those of a film surface which has not been pretreated are achieved in the novel process. This is all the more surprising since, according to the prior art, the heat development in the flame treatment without polarization is higher than in the flame treatment with polarization. In the novel process, presumably the degradation reactions initiated by the great heat development in the sealing layer are immediately stopped by the rapid cooling, so that no material damage which reduces the sealability can occur.

There are several technical possibilities for cooling the film very rapidly during the flame treatment. One possibility is to cool the cooling roll (4) so that its surface temperature is substantially below the stated film temperature of 25° C. In order to obtain a film temperature of less than 25° C. directly after leaving the cooling roll (4), the cooling roll surface is preferably kept at a temperature below 20° C., in particular below a temperature of 17° C., very preferably below a temperature of 14° C. The temperature of the cooling medium in the cooling roll (4) is preferably less than 15° C., in particular less than 12° C., very preferably less than 9° C. The cooling medium in the interior of the roll is preferably recooled water or another suitable coolant, such as, for example, Frigen.

Specifically, the following conditions have proven advantageous in carrying out the process (FIG. 1): The cooling roll (4) on which the film is flame-treated has a diameter of from 200 to 600 mm, in particular from 300 to 500 mm, in the preferred embodiment. The diameter of the feed/nip roll (2) is from 150 to 450 mm, in particular from 200 to 400 mm, in the preferred embodiment. The feed angle (5) is from 10 to 40° in the preferred embodiment, but may also be larger. In the preferred embodiment, the burner (1) has a grid (7) with a mesh size (8) of from 2 to 15 mm, in particular from 3 to 10 mm (cf. FIG. 1, view "A"). The temperature of the flame is preferably from 650 to 850° C., in particular from 700 to 800° C. The gas throughput depends, inter alia, on the polymers of the film surface which are to be treated, on the film web width and on the film web speed. A preferred range for the gas throughput/film web width is from 20 to 60 m³ (S.T.P.)/h·m, in particular 30–50 m³ (S.T.P.)/h·m. The angle of wrap (6) of the film on the roll is preferably from 120 to 200°, in particular from 130 to 180°. The machine speed can be varied in a wide range, depending on the film type, the preferred range being within from 50 to 500 m/min, in particular within from 80 to 450 m/min.

Figure 2:
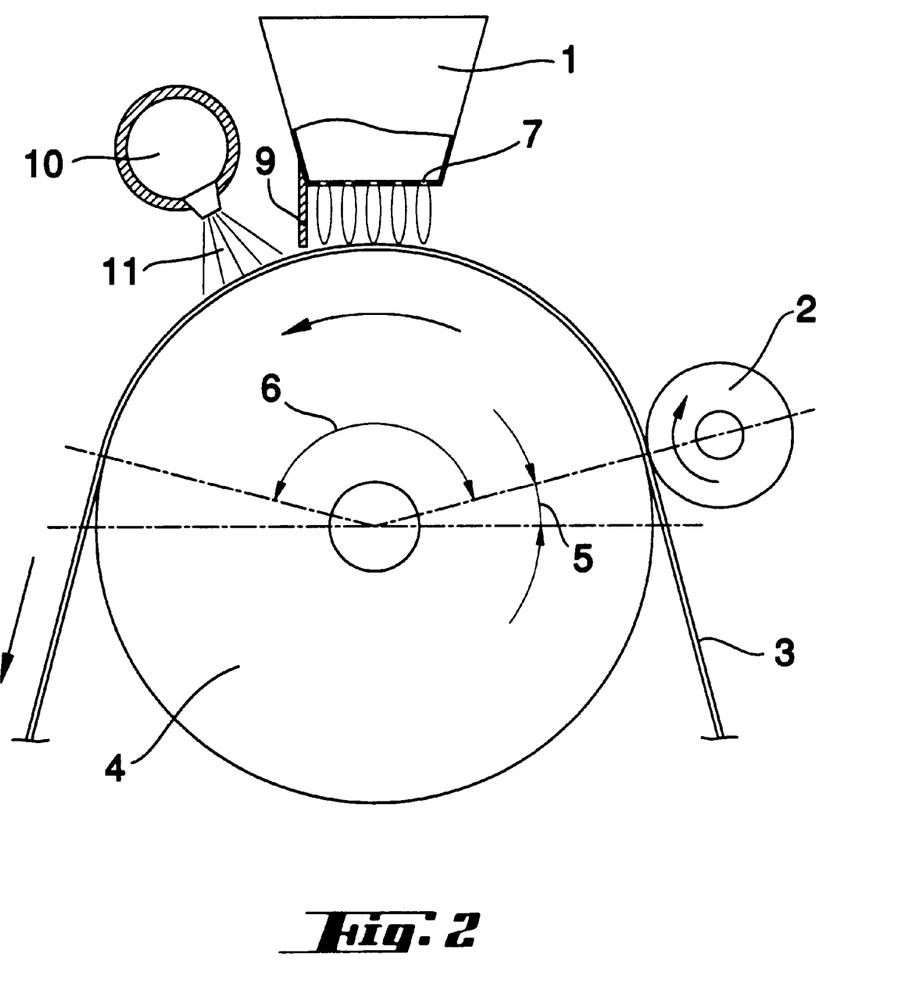
FIG. 2 is a schematic drawing of the flame treatment process including additional cooling of the film surface by spraying of a suitable coolant.

In a preferred embodiment of the invention, the flame-treated film surface is additionally cooled. This may be effected shortly before the flame treatment, during the flame treatment and/or shortly thereafter. The following technical procedures have proven practical:

Spraying or blowing the film surface by means of a spray tube (10) with a suitable coolant (FIG. 2). Suitable coolants are, for example, water and/or air. Very rapid cooling of the film surface is achieved by wetting the film with a fine water mist (11) which is produced by suitably shaped nozzles. This does not adversely affect the process. The water film deposited on the film evaporates or is blown away by means of air. Another technical variant comprises intensively blowing the film surface directly with air with the aid of an air squeegee. In this case, the flame must be shielded from the air stream (13), for example by means of a suitable metal sheet. The processes described are used directly after and/or before flame treatment.

Figure 3:
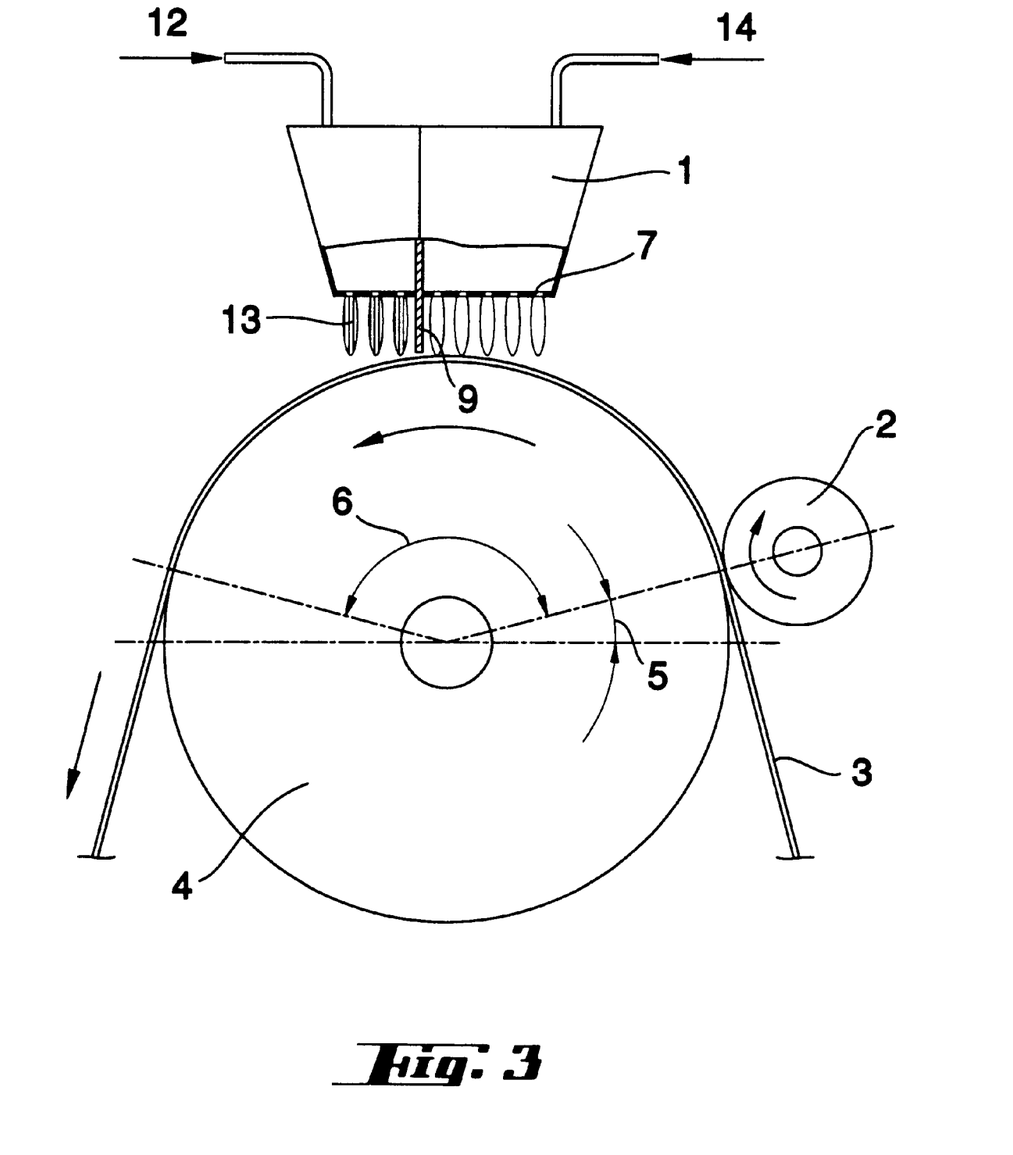
FIG. 3 is a schematic drawing of the flame treatment process including additional cooling, wherein a cooling medium flows through a chamber in a burner, separate from a gas mixture.

Division of the burner (1) into a plurality of sections which are separated with regard to flow and through which different media flow (cf. FIG. 3). The Figure shows the division of the burner (1) into two separate chambers. The gas mixture (14) (eg. propane or city gas mixed with air from the atmosphere) flows into the front chamber of the burner (1) via an appropriate feed line and exits via a fine mesh/grid (7). A typical mesh size (8) is 5 mm, and a typical grid length in the machine direction is 30 mm (cf. also FIG. 1, view "A"). The number of flames produced is determined by the mesh size, the length of the grid in the machine direction and the burner width. The cooling air (12) or another cooling medium is passed through the second chamber located behind. In order to achieve a high flow velocity of the air relative to the film, a fine division of the grid is necessary. Mesh/grid sizes of from about 0.5 to 3 mm have proven useful. When this concept is used, it is preferable to integrate a suitable shield (9) for the flame into the burner (1), for example a metal sheet which is adjustable in height.

It has furthermore been found that the sealing properties depend essentially on the degree of cooling of the film. Surprisingly, it has been found that the degree of cooling can be directly related to the minimum sealing temperature (MST) of the top layer of the film. Accordingly, for an MST of from 100 to 130° C., the temperature of the flame-treated surface of the film directly after leaving the cooling roll (4) must be less than 25° C., and for an MST of from 70 to 100° C., the temperature of the flame-treated surface of the film directly after leaving the cooling roll (4) must be less than 20° C.

It was very surprising that the flame-treated sealing layer is not impaired or only insignificantly impaired in its sealability simply as a result of using the novel process. Furthermore, it was very surprising that no condensation or very little condensation occurs on the film surface. The condensation is so small that no additional problems occur. As a rule, the water condensed on the film surface has evaporated after a transport distance of only from 1 to 2 m.

A further major advantage of using the process according to the invention is that the film does not acquire a static charge. Satisfactory handling and satisfactory further processing of the film are possible without restrictions. The film can be unwound without problems.

Preferably, the film is a multilayer film and has at least one sealable top layer on its base layer. In a particular embodiment, the film has top layers on both sides of its base layer. In a further embodiment, the film has at least one intermediate layer on its base layer, if necessary on both sides.

The base layer of the film contains in general at least 85% by weight, preferably from 90 to 99% by weight, based in each case on the base layer, of a propylene homopolymer described below and, if required, additives in effective amounts in each case.

The propylene homopolymer of the base layer has a melting point of from 140 to 165° C., preferably from 155 to 162° C., and a melt flow index (measurement according to DIN 53 735 at 21.6 N load and 230° C.) of from 1.0 to 10 g/10 min, preferably from 1.5 to 6 g/10 min. The n-heptane-soluble fraction of the polymer is in general from 1 to 10% by weight, based on the starting polymer. The n-heptane-insoluble fraction of the propylene homopolymer is isotactic. The chain isotaxy index determined by means of $^{13}$C-NMR spectroscopy is more than 85%, preferably more than 90%.

If the film is opaque, the base layer additionally contains vacuole-initiating substances, eg. $CaCO_3$, or incompatible polymers, as described in the prior art.

The molecular weight distribution of the propylene homopolymer may be varied within wide limits, depending on the field of use. The ratio of the weight average molecular weight $M_w$ to the number average molecular weight $M_n$ is in general from 2 to 15.

In a preferred embodiment of the film according to the invention, the ratio of the weight average molecular weight $M_w$ to the number average molecular weight $M_n$ is from 2 to 6, very particularly preferably from 3 to 5. Such a narrow molecular weight distribution of the propylene homopolymer of the base layer is achieved by peroxidic degradation thereof.

A measure of the degree of degradation of the polymer is the so-called degradation factor A, which indicates the relative change in the melt flow index according to DIN 53 735 of the polypropylene, based on the starting polymer.

$$A = \frac{MFI_2}{MFI_1}$$

$MFI_1$=Melt flow index of the propylene polymer before the addition of the organic peroxide $MFI_2$=Melt flow index of the propylene polymer degraded by peroxide In general, the degradation factor A of the propylene polymer used is in a range from 3 to 15, preferably from 6 to 10. Particularly preferred organic peroxides are dialkyl peroxides, an alkyl radical being understood as meaning the usual saturated straight-chain or branched lower alkyl radicals having up to six carbon atoms. 2,5-Dimethyl-2,5-di(tert-butylperoxy)hexane and di-tert-butyl peroxide are particularly preferred.

If necessary, conventional hydrocarbon resins may also be added to the base layer. Resins are low molecular weight polymers whose molecular weight is in general in a range from 200 to 10,000, preferably from 300 to 8,000, in particular from 400 to 5,000. The molecular weight of the resin is thus substantially lower than that of the propylene polymers, which generally have a molecular weight of more than 100,000. The softening point of the resin is from 60 to ° C. (measured according to DIN 1995-U4, corresponding to ASTM E-28). Among the many low molecular weight resins, the hydrocarbon resins are preferred, in particular in the form of the mineral oil resins (petroleum resins), styrene resins, cyclopentadiene resins and terpene resins (these resins are described in Ullmanns Enzyclopädie der techn. Chemie, 4th Edition, Volume 12, pages 525 to 555).

Preferred resins are in particular the hydrocarbon resins. The hydrocarbon resins may be partially or completely hydrogenated. Suitable resins are in principle synthetic resins or resins of natural origin. It has proven particularly advantageous to use resins having a softening point greater than 60° C., those having a softening point of from 70 to 180° C., in particular from 80 to 160° C., being preferred.

The mineral oil resins are those hydrocarbon resins which are prepared by polymerization of deep-decomposed mineral oil materials in the presence of a catalyst. These mineral oil materials usually contain a mixture of resin-forming substances, such as styrene, methylstyrene, vinyltoluene, indene, methylindene, butadiene, isoprene, piperylene and pentylene. The styrene resins are homopolymers of styrene or copolymers of styrene with other monomers, such as methylstyrene, vinyltoluene and butadiene. The cyclopentadiene resins are cyclopentadiene homopolymers or cyclopentadiene copolymers which are obtained from coal tar distillates and fractionated petroleum gas. These resins are prepared by keeping the materials which contain cyclopentadiene at a high temperature for a long time. Depending on the reaction temperature, dimers, trimers or oligomers can be obtained. The terpene resins are polymers of terpenes, i.e. hydrocarbons of the forms $C_{10}H_{16}$, which are contained in virtually all essential oils or oil-containing resins of plants, and phenol-modified terpene resins. Pinene, α-pinene, dipentene, limonene, myrcene, camphene and similar terpenes may be mentioned as specific examples of the terpenes. The hydrocarbon resins may be the so-called modified hydrocarbon resins. The modification is effected in general by reacting the raw materials prior to the polymerization, by introducing special monomers or by reacting the polymerized product, in particular hydrogenations or partial hydrogenations being carried out.

Furthermore, styrene homopolymers, styrene copolymers, cyclopentadiene homopolymers, cyclopentadiene copolymers and/or terpene polymers, each having a softening point above 110° C., are used as hydrocarbon resins (in the case of the unsaturated polymers, the hydrogenated product is preferred). The cyclopentadiene polymers having a softening point of 120° C. or higher, or copolymers of α-methylstyrene and vinyltoluene having a softening point of from 100 to 180° C., are very particularly preferred.

Furthermore, the base layer may additionally contain conventional additives, such as antistatic agents, antiblocking agents, lubricants, stabilizers, neutralizing agents and/or nucleating agents, in effective amounts in each case. The weights stated below relate to the base layer.

Preferred antistatic agents are alkali metal alkanesulfonates, polyether-modified, i.e. ethoxylated and/or propoxylated, polydiorganosiloxanes (polydialkylsiloxanes, polyalkylphenylsiloxanes and the like) and/or the essentially straight-chain and saturated aliphatic tertiary amines having an aliphatic radical having 10 to 20 carbon atoms which are substituted by ω-hydroxy-$C_1$–$c_4$-alkyl groups, N,N-bis(2-hydroxyethyl)alkylamines having 10 to 20 carbon atoms, preferably 12 to 18 carbon atoms, in the alkyl radical being particularly suitable. The effective amount of antistatic agent is in the range from 0.05 to 0.5% by weight. Furthermore, glyceryl mono-stearate in an amount of from 0.03 to 0.5% by weight is preferably used as an antistatic agent.

Suitable antiblocking agents are inorganic additives, such as silica, calcium carbonate, magnesium silicate, aluminum silicate, calcium phosphate and the like, and/or incompatible organic polymers, such as polyamides, polyesters, polycarbonates and the like, benzoguanamine/ formaldehyde polymers, silica and calcium carbonate being preferred. The effective amount of antiblocking agent is in the range from 0.1 to 2% by weight, preferably from 0.1 to 0.8% by weight. The mean particle size is from 1 to 6 $\mu$m, in particular from 2 to 5 $\mu$m, particles having a spherical shape, as described in EP-A-0 236 945 and DE-A-38 01 535, being particularly suitable. The anti-blocking agents are preferably added to the top layers.

Lubricants are higher aliphatic amides, higher aliphatic esters, waxes and metal soaps and polydimethylsiloxanes. The effective amount of lubricant is in the range from 0.01 to 3% by weight, preferably from 0.02 to 1% by weight. The addition of higher aliphatic amides in an amount of from 0.01 to 0.25% by weight to the base layer and/or to the top layers is particularly suitable. A particularly suitable aliphatic amide is erucamide.

Polydimethylsiloxanes are preferably added in an amount of from 0.02 to 2.0% by weight, in particular polydimethylsiloxanes having a viscosity of from 5,000 to 1,000,000 $mm^2$/s. The addition of polydimethylsiloxanes to the top layer which is not to be pretreated and/or to one intermediate layer or to both intermediate layers is particularly advantageous.

The conventional stabilizing compounds for ethylene polymers, propylene polymers and other α-olefin polymers may be used as stabilizers. The added amount thereof is from 0.05 to 2% by weight. Phenolic stabilizers, alkali metal/ alkaline earth metal stearates and/or alkali metal/ alkaline earth metal carbonates are particularly suitable.

Phenolic stabilizers are preferred in an amount of from 0.1 to 0.6% by weight, in particular from 0.15 to 0.3% by weight, and with a molecular weight of more than 500 g/mol. Pentaerythrityl tetrakis-3-(3,5-di-tert-butyl-4-hydroxyphenyl)propionate and 1,3,5-trimethyl-2,4,6-tris(3,5-di-tert-butyl-4-hydroxybenzyl)benzene are particularly advantageous.

Neutralizing agents are preferably dihydrotalcite, calcium stearate and/or calcium carbonate having a mean particle size of not more than 0.7 μm, an absolute particle size of less than 10 μm and a specific surface area of at least 40 m²/g.

The polypropylene film produced by the process according to the invention comprises in general at least one sealable top layer which is preferably sealable on both sides and comprises polymers of olefins having 2 to 10 carbon atoms. In general, the top layer contains from 90 to 100% by weight, preferably from 98 to 100% by weight, of the olefinic polymers, based in each case on the weight of the top layer.

Examples of such olefinic polymers are
   a copolymer of ethylene and propylene or ethylene and 1-butylene or propylene and 1-butylene or
   a terpolymer of ethylene and propylene and 1-butylene or
   a mixture of two or more of the stated homo-, co- and terpolymers or
   a blend of two or more of the stated homo-, co- and terpolymers, if necessary mixed with one or more of the stated homo-, co- and terpolymers,
random ethylene/propylene copolymers having
   an ethylene content of from 1 to 10% by weight, preferably from 2.5 to 8% by weight, or
   random propylene/1-butylene copolymers having a butylene content of from 2 to 25% by weight, preferably from 4 to 20% by weight, based in each case on the total weight of the copolymer, or
   random ethylene/propylene/1-butylene terpolymers
   having an ethylene content of from 1 to 10% by weight, preferably from 2 to 6% by weight, and a 1-butylene content of from 2 to 30% by weight, preferably from 4 to 20% by weight, based in each case on the total weight of the terpolymer, or
   a blend of an ethylene/propylene/1-butylene terpolymer and a propylene/1-butylene copolymer having an ethylene content of from 0.1 to 7% by weight and a propylene content of from 50 to 90% by weight and a 1-butylene content of 10 to 40% by weight, based in each case on the total weight of the polymer blend, being particularly preferred.

The propylene homopolymer used in the top layer contains at least 90% of propylene and has a melting point of 140° C. or higher, preferably from 150 to 170° C., isotactic homopolypropylene being preferred. The homopolymer has in general a melt flow index of from 1.5 to 20 g/10 min, preferably from 2.0 to 15 g/10 min.

The copolymers used in the top layer and described above have in general a melt flow index of from 1.5 to 30 g/10 min, preferably from 3 to 15 g/10 min. The melting point is in the range from 120 to 140° C. The terpolymers used in the top layer have a melt flow index in the range from 1.5 to 30 g/10 min, preferably from 3 to 15 g/10 min, and a melting point in the range from 120 to 140° C. The blend described above and comprising co- and terpolymers has a melt flow index of from 5 to 9 g/10 min and a melting point of from 120 to 150° C. All melt flow indices stated above are measured at 230° C. and at a force of 21.6 N (DIN 53 735).

If required, the polymers of the top layer may be degraded by peroxide in the same manner as described above for the base layer, in principle the same peroxides being used. The degradation factor for the polymers of the top layer is in general in a range from 3 to 15, preferably from 6 to 10.

If required, the top layers may contain antistatic agents, antiblocking agents, lubricants, neutralizing agents, stabilizers and the resins described above. The stated amounts are based on the top layer or layers. The top layer which is flame-treated preferably contains no incorporated polydialkylsiloxane.

In another preferred embodiment, one or more intermediate layers may be applied between the base layer and the top layer or layers. The intermediate layer or layers may comprise the polymers described for the top layers. In a particularly preferred embodiment, the intermediate layer or layers comprises or comprise the propylene homopolymer described for the base layer. The intermediate layers may contain the additives which are customary for the top layers.

The thickness of the top layers is greater than 0.1 to 5 μm and is preferably in the range from 0.2 to 1.5 μm, in particular from 0.3 to 1.0 μm, it being possible for the top layers to have the same thickness or different thicknesses.

The thickness of the intermediate layer or layers is greater than 0.1 μm and is preferably in the range from 0.5 to 15 μm, in particular from 0.7 to 10 μm.

The total thickness of the polypropylene film according to the invention may vary within wide limits and depends on the intended use. It is preferably from 4 to 120 μm, in particular from 5 to 100 μm, preferably from 6 to 80 μm, the base layer accounting for from about 40 to 100% of the total film thickness.

The invention furthermore relates to a process for the production of the polypropylene film according to the invention by the coextrusion method known per se.

In this process, the melts corresponding to the individual layers of the film are coextruded through a slot die, the melt film thus obtained is drawn off for solidification on one or more rolls and the film is then stretched at least monoaxially, preferably biaxially, heat-set and flame-treated.

The biaxial stretching (orientation) is generally carried out in succession, the successive biaxial stretching in which stretching is effected first longitudinally (in the machine direction) and then transversely (at right angles to the machine direction) being preferred.

As is customary in the coextrusion process, the polymers or the polymer mixtures of the individual layers are first compressed and liquefied in extruders, it being possible for any additives introduced already to be present in the polymers or in the polymer mixtures. The melts are then simultaneously forced through a slot die, and the extruded composite melt film is drawn off on one or more draw-off rolls, said film being cooled and solidified. The film thus obtained is then stretched longitudinally and transversely with respect to the extrusion direction, which leads to orientation of the molecular chains. Longitudinal stretching is expediently carried out with the aid of two rolls which operate at different speeds depending on the desired stretching ratio, and transverse stretching is carried out with the aid of an appropriate clamping frame. The longitudinal stretching ratios are in the range from 4.5 to 9, preferably from 5.5 to 8.5, and the transverse stretching ratios are in the range from 7 to 12, preferably from 8 to 11.

The biaxial stretching of the film is followed by heat-setting (heat treatment) thereof, the film being kept at a temperature of from 80 to 160° C. for from 0.1 to 10 s. This is followed by the flame treatment, according to the invention, of the film. The intensity of treatment is in general in the range from 36 to 50 mN/m, preferably from 30 to 45 mN/m. The film thus produced is wound up in a conventional manner using a winding means.

It has proven particularly advantageous for the draw-off roll or rolls, by means of which the extruded melt film is cooled and solidified, to be kept at a temperature of from 10 to 100° C., preferably from 20 to 70° C., by means of a heating and cooling circulation.

The temperatures at which the longitudinal and the transverse stretching are carried out may be varied in a relatively wide range and depend on the particular composition of the individual layers and on the desired properties of the film. In general, the longitudinal stretching is preferably carried out at from 80 to 150° C. and the transverse stretching preferably at from 120 to 170° C.

The film produced by the process according to the invention is particularly suitable for high-speed packaging machines. It has all the important properties which are required of polypropylene films which are to be used on high-speed packaging machines. It has in particular good sealability, low static charge build-up, excellent running properties and at the same time good printability.

The following measuring methods were used for characterizing the raw materials and the films:

Melt flow index

The melt flow index was measured with reference to DIN 53 735, at 21.6 N load and 230° C.

Melting point

DSC measurement, maximum of the melting curve, heating rate 20° C./min.

Surface tension

The surface tension was determined by the so-called ink method (DIN 53 364).

Printability

The flame-treated films were printed 14 days after their production (short-term evaluation) and 6 months after their production (long-term evaluation). The ink adhesion was assessed by means of the self-adhesive tape test. The ink adhesion was assessed as being moderate if little ink could be removed by means of the self-adhesive tape, and as poor in the case of substantial removal of ink.

Molecular weight determination

Three-detector gel permeation chromatography is used for determining the average molecular weight. The substance is dissolved in a mobile phase, such as THF, and applied to a separation column. The separation column is 90 cm long and is filled with a porous carrier whose pore size is 5 $\mu$m. Detection is carried out by means of UV absorption spectroscopy at various wavelengths and by means of the refractive index and light scattering power of the fractions. Calibration is carried out using a standard compound having a known molecular weight. Comparison of the UV absorption of the standard substance with the absorption of the sample makes it possible to assign the molecular weights.

Determination of the minimum sealing temperature (MST)

The minimum sealing temperature is determined by the peel method. Heat-sealed samples (seal 20 mm×150 mm) are produced using the HSG/ET sealing unit from Brugger, by sealing a film at different temperatures with the aid of two heated sealing jaws at a sealing pressure of 15 N/cm² and in a sealing time of 0.5 s. 15 mm wide test strips are cut from the sealed samples. The ultimate seal strength, i.e. the force required to separate the test strips, is determined by means of a tensile tester at a peel rate of 200 mm/min, the plane of the seal making a right angle with the direction of tension.

The minimum sealing temperature is the temperature at which a seal strength of 0.5/15 mm is reached.

In addition, the tear strength at a sealing temperature of 130° C. was measured, likewise by the peel method.

Static charge build-up on the film

The static charge build-up on the film is assessed during production, directly after leaving the cooling roll, by means of the EMF 57 influence field meter from Eltex. The field strength on the film surface is measured over the width of the film web. The static behavior of the film is acceptable if the increase in the field strength after the cooling roll is not more than 10 kV/m.

Measurement of the film surface temperature

The film surface temperature is measured using an IR measuring instrument.

Measurement of the flame temperature

A small amount of the gas or air stream (13) is removed and a comparison flame is formed therewith. The temperature of this comparison flame is measured using a resistance thermometer.

The invention is illustrated in more detail with reference to Examples.

EXAMPLE 1

A transparent three-layer film having a symmetrical structure and a total thickness of 20 $\mu$m was produced by coextrusion and subsequent stepwise orientation in the longitudinal direction and in the transverse direction. The top layers each had a thickness of 0.6 $\mu$m.

| A - base layer: | |
| --- | --- |
| 99.70% by weight | of isotactic polypropylene from Solvay with the brand name ®Eltex PHP 405 |
| 0.15% by weight | of N,N-bisethoxyalkylamine |
| 0.15% by weight | of erucamide |
| B - top layers: | |
| 99.67% by weight | of random ethylene/propylene copolymer having a $C_2$ content of 4.5% by weight |
| 0.33% by weight | of $SiO_2$ as an antiblocking agent, having a mean particle size of 4 $\mu$m |

The production conditions in the individual process steps are:

| Extrusion: | Temperatures: | |
| --- | --- | --- |
| | A layer | 280° C. |
| | B layers | 280° C. |
| | Temperature of the draw-off roll | 30° C. |
| Longitudinal stretching: | Temperature | 130° C. |
| | Longitudinal stretching ratio | 5 |
| Transverse stretching: | Temperature | 160° C. |
| | Transverse stretching ratio | 10 |
| Fixing: | Temperature | 140° C. |
| | Convergence | 15% |

One side of the film (D side) was pretreated with the flame under pressure. The essential parameters in the pretreatment were:

| Film web speed | 230 m/min |
| --- | --- |
| Film web width | 5 m |
| Gas throughput | 170 m³/h |
| Flame temperature | 750° C. |
| Burner/cooling roll gap width | 4 mm |
| Interior temperature of cooling roll | 10° C. |
| Cooling roll surface temperature | 19° C. |
| Film temperature directly after cooling roll | 23° C. |

The gas used was conventional city gas. The film properties obtained are shown in the Table. In the above process data, the surface tension of the flame-treated side is 39 N/mm.

EXAMPLE 2

In comparison with Example 1, a random ethylene/propylene/butylene terpolymer having a $C_2$ content of 3% by weight and a $C_4$ content of 8% by weight was used in the top layers, instead of the random copolymer. The altered parameters in the pretreatment were:

| | |
|---|---|
| Interior temperature of cooling roll | 8° C. |
| Cooling roll surface temperature | 17° C. |
| Film temperature directly after cooling roll | 21° C. |

EXAMPLE 3

In comparison with Example 1, the low-sealing Tafmer XR 106 L (reactor blend of $C_2C_3C_4$ and $C_3C_4$) was used in the top layers, instead of the random copolymer. The altered parameters in the pretreatment were:

| | |
|---|---|
| Interior temperature of cooling roll | 3° C. |
| Cooling roll surface temperature | 12° C. |
| Film temperature directly after cooling roll | 15° C. |

EXAMPLE 4

Figure 1:
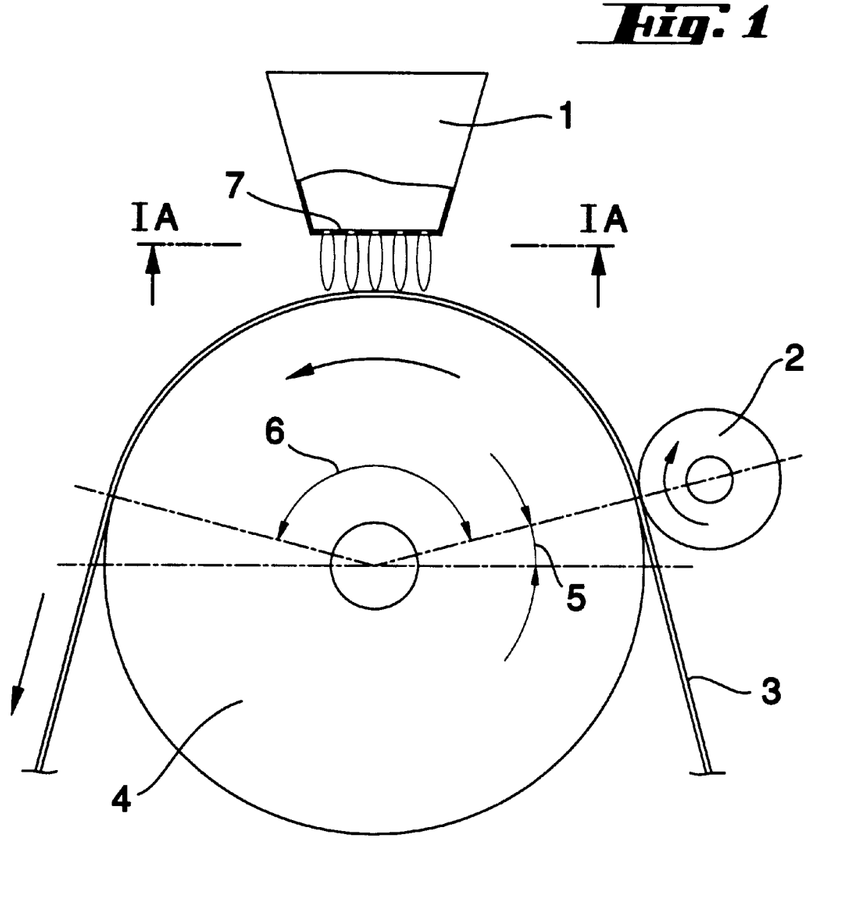
FIG. 1 is a schematic drawing of the flame treatment process according to the invention.
Figure 1A:
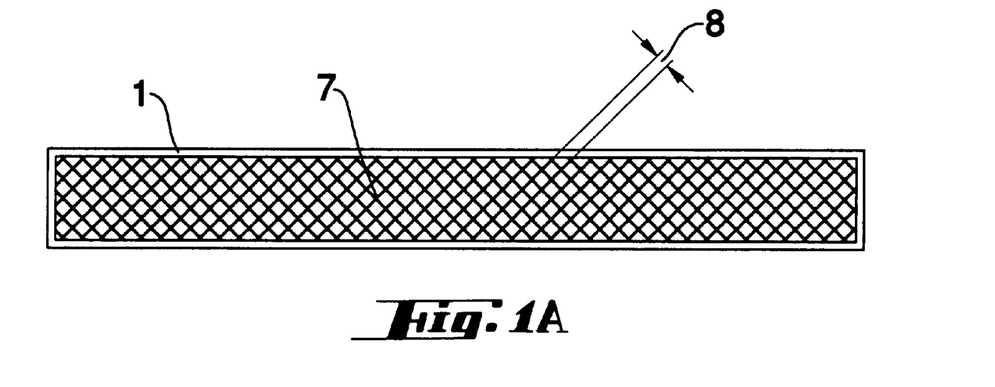
FIG. 1A illustrates a burner grid having a mesh size from 2 to 15 mm.

In comparison with Example 1, the film surface was additionally sprayed with water mist (11) via a spray tube (10) directly after the flame treatment (cf. FIG. 1).

COMPARATIVE EXAMPLE 1

In comparison with Example 1, the flame treatment was now carried out with polarization.

COMPARATIVE EXAMPLE 2

In comparison with Example 1, the flame treatment was now carried out at a cooling roll temperature of 40° C. The D side is no longer sealable.

COMPARATIVE EXAMPLE 3

In comparison with Example 1, the flame treatment was now carried out with the burner arranged below the cooling roll (4). Here, inadmissible condensate formation took place.

We claim:

1. A process for the treatment of a sealable polypropylene film surface by means of an unpolarized flame to increase the surface tension of the film, wherein:
   the polypropylene film having a thickness of 4 to 120 µm is passed over a cooling roll;
   a burner is mounted above the cooling roll;
   the unpolarized flame is produced by means of the burner;
   the film is flame-treated with the unpolarized flame; and
   the film is cooled by means of the cooling roll to thereby produce a flame-treated surface having a temperature upon leaving the cooling roll of not more than 25° C. such that the sealability of the film is not impaired or only insignificantly impaired, no condensation or very little condensation occurs on the film surface, and no static charge is acquired.

2. The process as claimed in claim 1, wherein the cooling roll has a temperature of less then 20° C.

3. The process as claimed in claim 1, wherein the cooling roll is cooled with a cooling medium, the cooling medium having a temperature of less than 15° C.

4. The process as claimed in claim 3, wherein the burner has at least two separate chambers, and a gas mixture to be burned flows through one of the chambers and the cooling medium flows through the other chamber.

5. The process as claimed in claim 4, wherein the flame produced by burning the gas mixture is shielded from the cooling medium by means of a sheet.

6. The process as claimed in claim 1, wherein the unpolarized flame has a temperature in the range from 650 to 850° C.

7. The process as claimed in claim 1, including additional cooling of the film by spraying the film with a suitable coolant.

8. The process as claimed in claim 7, wherein the suitable coolant is air or water mist.

9. The process as claimed in claim 1, wherein the sealable film surface has a minimum sealing temperature of from 100 to 130° C. and the temperature of the film surface on leaving the cooling roll is less than 25° C.

10. The process as claimed in claim 1, wherein the sealable film surface has a minimum sealing temperature of from 70 to 100° C. and the temperature of the film surface on leaving the cooling roll is less than 20° C.

11. The process as claimed in claim 1, wherein the film is a multilayer film and has a base layer and at least one sealable top layer.

12. The process as claim in claim 11, wherein the base layer contains from 90 to 99% by weight of a propylene polymer and the at least one sealable top layer contains from 90 to 100% by weight of olefinic polymers having 2 to 10 carbon atoms.

13. The process as claimed in claim 12, wherein the olefinic polymers are a copolymer of
   ethylene and propylene or
   ethylene and 1-butylene or
   propylene and 1-butylene or
   a terpolymer of
   ethylene and propylene and 1-butylene or a mixture of two or more of the stated homo-, co- and terpolymers or a blend of two or more of the stated homo-, co- and terpolymers.

14. The process as claimed in claim 11, wherein the at least one sealable top layer is from 0.1 to 5 µm thick.

15. The process for the production of a film, in which a plurality of melts corresponding to individual layers of the film are coextruded through a slot die, the film thus obtained is drawn off for solidification on one or more rolls and stretching the film at least monoaxially, and wherein said film is treated by a process as claimed in claim 1.

* * * * *

UNITED STATES PATENT AND TRADEMARK OFFICE
CERTIFICATE OF CORRECTION

PATENT NO. : 5,914,079
DATED : June 22, 1999
INVENTOR(S) : Herbert Peiffer, et. al.

It is certified that error appears in the above-identified patent and that said Letters Patent is hereby corrected as shown below:

Column 2, after line 21, insert -- SUMMARY OF THE INVENTION --.

Column 3, after line 11, delete "Frigen" and insert -- fluorchlorhydrocarbons such as FRIGEN --.

Column 6, line 25, "$c_4$" should read -- $C_4$ --.

Column 9, line 65, "0.5/15mm" should read -- 0.5N/15mm --.

Signed and Sealed this

Thirtieth Day of November, 1999

Attest:

Q. TODD DICKINSON

*Attesting Officer*      *Acting Commissioner of Patents and Trademarks*